US 12,187,128 B2

(12) United States Patent
Park et al.

(10) Patent No.: US 12,187,128 B2
(45) Date of Patent: Jan. 7, 2025

(54) POWER TRANSMISSION APPARATUS FOR HYBRID VEHICLE

(71) Applicant: Valeo Kapec Co., Ltd., Daegu (KR)

(72) Inventors: Jinsu Park, Daegu (KR); Jungwoo Kim, Daegu (KR)

(73) Assignee: Valeo Kapec Co., Ltd., Daegu (KR)

( * ) Notice: Subject to any disclaimer, the term of this patent is extended or adjusted under 35 U.S.C. 154(b) by 0 days.

(21) Appl. No.: 18/560,698

(22) PCT Filed: Apr. 4, 2022

(86) PCT No.: PCT/KR2022/004802
§ 371 (c)(1),
(2) Date: Nov. 14, 2023

(87) PCT Pub. No.: WO2022/239969
PCT Pub. Date: Nov. 17, 2022

(65) Prior Publication Data
US 2024/0246406 A1 Jul. 25, 2024

(30) Foreign Application Priority Data

May 14, 2021 (KR) .................... 10-2021-0062770

(51) Int. Cl.
*B60K 6/405* (2007.10)
*B60K 6/26* (2007.10)
(Continued)

(52) U.S. Cl.
CPC ............. *B60K 6/405* (2013.01); *B60K 6/26* (2013.01); *B60K 6/387* (2013.01); *B60K 2006/4825* (2013.01)

(58) Field of Classification Search
CPC ............ B60K 6/405; B60K 6/20–6/547
See application file for complete search history.

(56) References Cited

U.S. PATENT DOCUMENTS 9,751,391 B2 * 9/2017 Lebeau .................... F16F 15/20
10,465,790 B2 * 11/2019 Cudok ..................... B60K 6/40
11,498,407 B2 * 11/2022 Kim ......................... B60K 6/48

FOREIGN PATENT DOCUMENTS

DE   102020115683 A1 * 12/2021
FR        2782355 A1 *  2/2000  ............... B60K 6/26
(Continued)

OTHER PUBLICATIONS

International Search Report issued Jul. 18, 2022 in PCT/KR2022/004802, filed on Apr. 4, 2022, 2 pages.

*Primary Examiner* — Sherry L Estremsky
(74) *Attorney, Agent, or Firm* — Oblon, McClelland, Maier & Neustadt, L.L.P.

(57) ABSTRACT

Disclosed is a power transmission apparatus for a hybrid vehicle. A power transmission apparatus for a hybrid vehicle according to an embodiment of the present invention includes a motor housing disposed between an engine and a transmission, at least one motor disposed in the motor housing and connected to a crankshaft of the engine or the transmission, a torsion damper provided in the motor housing, disposed between the engine and the transmission, and having a radially outer side coupled to the at least one motor, a spline hub connected to the torsion damper and configured to transmit driving power, which is transmitted to the torsion damper, to the transmission, and a dust collecting unit disposed in a working fluid flow path through which a working fluid introduced from the transmission passes through the torsion damper and flows toward the at least one motor, installed at a position spaced apart radially outward from the torsion damper based on a radial direction, and configured to collect produced from the torsion damper and contained in the working fluid.

23 Claims, 9 Drawing Sheets

(51) Int. Cl.
*B60K 6/387* (2007.10)
*B60K 6/48* (2007.10)

(56) References Cited

FOREIGN PATENT DOCUMENTS

| | | | |
|---|---|---|---|
| JP | 2005-299903 A | | 10/2005 |
| KR | 10-0704501 B1 | | 4/2007 |
| KR | 10-2021-0040031 A | | 4/2021 |
| KR | 10-2238844 B1 | | 4/2021 |
| KR | 20210156552 A | * | 12/2021 |
| KR | 102641897 B1 | * | 2/2024 |
| WO | WO 2014/049244 A1 | | 4/2014 |

* cited by examiner

000# POWER TRANSMISSION APPARATUS FOR HYBRID VEHICLE

TECHNICAL FIELD

The present invention relates to a power transmission apparatus for a hybrid vehicle, and more particularly, to a power transmission apparatus for a hybrid vehicle to which at least one motor, particularly two or more motors and a torsion damper are applied, the power transmission apparatus being configured to prevent dust produced by the torsion damper from being introduced into the motor and a transmission.

BACKGROUND ART

An environmentally-friendly technology of vehicles is a key technology of the future vehicle industry, and vehicle manufacturers have made a great effort to develop environmentally-friendly vehicles in order to meet regulations associated with the environment and fuel economy.

Examples of the future vehicle technology may include an electric vehicle (EV) using electrical energy, a hybrid electric vehicle (HEV), and a double-clutch transmission (DCT) with improved efficiency and convenience.

The hybrid electric vehicle is a vehicle using two or more power sources, and the two or more power sources may be combined in various ways. Typically, a gasoline or diesel engine using fossil fuel and a motor/generator operated by electrical energy are combined (hybrid).

The hybrid electric vehicle is equipped with both an internal combustion engine and a motor, which may innovatively reduce the amount of emission of harmful gas and fuel consumption in comparison with general vehicles.

Regarding the hybrid electric vehicle, there has been a need to develop a power transmission apparatus equipped with an engine clutch and a torque converter which are capable of implementing effective power transmission and reducing the size and the number of components in order to effectively transmit rotational power from the engine and the motor to the transmission, improve the efficiency, and maximize fuel economy.

In this case, a power transmission apparatus for a hybrid vehicle has a layout in which an automatic transmission, a motor, an engine, and an ISG (integrated starter & generator) are arranged in a row.

In the hybrid vehicle using the engine and the motor, the motor is used to activate the initial start of the vehicle, and a generator, i.e., the ISG (integrated starter & generator) starts the engine when the vehicle travels at a predetermined speed, such that the hybrid vehicle uses both an output of the engine and an output of the motor.

Meanwhile, the motor used for the power transmission apparatus for a hybrid vehicle may operate to electrically drive the vehicle when the engine does not initially operate. Further, recently, the number of motors is not limited to one, and two or more motors are disposed.

For example, in case that the two motors are disposed in the power transmission apparatus for a hybrid vehicle, a first motor may operate to start the engine, and a second motor may operate to electrically drive the vehicle.

However, when the power transmission apparatus in the related art operates, iron powder dust generated by a torsion damper is contained in a working fluid and dispersed while flowing in the power transmission apparatus, and the dust is attached to the motor, which degrades performance of the motor, causes damage to and breakdown of the motor, and degrades durability.

In addition, the deterioration in performance of the motor also causes an unnecessary loss of power and degrades overall fuel economy.

In addition, in case that dust generated by the torsion damper is introduced into the transmission while circulating in the state of being contained in the working fluid, there is a problem in that the dust causes a breakdown of the transmission.

The above information disclosed in this Background section is only for enhancement of understanding of the background of the invention and therefore it may contain information that does not form the prior art that is already known in this country to a person of ordinary skill in the art.

DISCLOSURE

Technical Problem

Accordingly, the present invention has been made in an effort to solve the above-mentioned problem, and an object of the present invention is to provide a power transmission apparatus for a hybrid vehicle to which at least one motor and a torsion damper are applied, the power transmission apparatus being configured to prevent dust generated by the torsion damper from being dispersed and introduced into the motor and a transmission.

Technical Solution

In order to achieve the above-mentioned object, a power transmission apparatus for a hybrid vehicle according to an embodiment of the present invention includes: a motor housing disposed between an engine and a transmission: at least one motor disposed in the motor housing and connected to a crankshaft of the engine or the transmission: a torsion damper provided in the motor housing, disposed between the engine and the transmission, and having a radially outer side coupled to the at least one motor: a spline hub connected to the torsion damper and configured to transmit driving power, which is transmitted to the torsion damper, to the transmission; and a dust collecting unit disposed in a working fluid flow path through which a working fluid introduced from the transmission passes through the torsion damper and flows toward the at least one motor, installed at a position spaced apart radially outward from the torsion damper based on a radial direction, and configured to collect produced from the torsion damper and contained in the working fluid.

The at least one motor may include: a first motor disposed in the motor housing and connected to the crankshaft of the engine; and a second motor disposed adjacent to the first motor in an axial direction and connected to the transmission.

The dust collecting unit may be disposed between the first motor and the second motor and provided at a position spaced apart radially inward from the first motor.

The first motor may be disposed radially outside a first motor sleeve fixed to a rotor shaft configured to receive driving power from the engine through the crankshaft, and the first motor may be fixed to the first motor sleeve by a first motor retainer.

The torsion damper may include: at least one first spring elastically supported by the first motor sleeve and configured to absorb vibration and impact in a rotation direction; a first cover plate fixed to the first motor sleeve and configured to support the first spring; a driven plate elastically supported by the at least one first spring, configured to receive driving power, and connected to the spline hub: a second cover plate fixed to the driven plate: and at least one second spring supported by the second cover plate, disposed in the rotation direction, and configured to absorb vibration and impact in the rotation direction.

The torsion damper may be disposed between the first motor and the second motor, and the first cover plate may be coupled to the first motor sleeve and provided at a position spaced apart radially outward from the first spring.

An outer peripheral surface of the at least one first spring may be elastically deformably supported by a spring guide interposed between the at least one first spring and a radial inner surface of the first motor sleeve.

The at least one second spring may be connected to the spline hub.

The dust collecting unit may include: a mounting member mounted on the first cover plate so that the mounting member partially protrudes toward the second motor based on the axial direction: and a collection member disposed between the first motor and the second motor and mounted radially inside the mounting member.

The mounting member may be bent in an "L" shape, and a gap may be formed between the mounting member and the second motor so that the working fluid flows between the mounting member and the second motor.

The collection member may be made of a material having a magnetic force so that dust produced from the at least one first spring or the at least one second spring is attached to the collection member.

The mounting member may be fixedly coupled to the first cover plate.

The dust collecting unit may include: a mounting part bent from the first cover plate so that the mounting part partially protrudes toward the second motor based on the axial direction; and a collection member disposed between the first motor and the second motor and mounted radially inside the mounting part.

The mounting part may be bent in a direction parallel to the axial direction, and a gap may be formed between the mounting part and the second motor so that the working fluid flows between the mounting part and the second motor.

The collection member may be made of a material having a magnetic force so that dust produced from the at least one first spring or the at least one second spring is attached to the collection member.

The second motor may be disposed radially outside a second motor sleeve and fixed to the second motor sleeve by a second motor retainer.

The dust collecting unit may include: a mounting part integrally protruding from the second motor sleeve toward the first motor based on the axial direction; and a collection member mounted radially inside the mounting part.

The mounting part may protrude in a direction parallel to the axial direction, and a gap may be formed between the mounting part and the torsion damper so that the working fluid flows between the mounting part and the torsion damper.

The collection member may be made of a material having a magnetic force so that dust produced from the at least one first spring or the at least one second spring is attached to the collection member.

The dust collecting unit may include: a mounting part integrally protruding from the second motor retainer toward the first motor based on the axial direction: and a collection member mounted radially inside the mounting part.

The mounting part may protrude in a direction parallel to the axial direction, and a gap may be formed between the mounting part and the torsion damper so that the working fluid flows between the mounting part and the torsion damper.

The collection member may be made of a material having a magnetic force so that dust produced from the at least one first spring or the at least one second spring is attached to the collection member.

The power transmission apparatus may further include: a clutch installed on the second motor and configured to selectively connect the second motor and the torsion damper.

Advantageous Effects

According to the power transmission apparatus for a hybrid vehicle according to the embodiment of the present invention described above, in the hybrid vehicle equipped with at least one motor and the torsion damper, the dust collecting unit may minimize a degree to which dust produced by the torsion damper is dispersed in the state of being contained in the working fluid and introduced into the motor and the transmission. Therefore, it is possible to prevent the deterioration in performance of the motor and the fuel economy.

In addition, according to the present invention, it is possible to prevent the deterioration in fuel economy by preventing the deterioration in performance of the motor, thereby reducing an unnecessary loss of power and meeting the requirements related to environmental issues and fuel economy.

In addition, according to the present invention, the motor is used as a mass body by assembling the torsion damper to the motor sleeve that serves as a rotor at the side of the engine. Therefore, the power transmission apparatus, together with the torsion damper, may efficiently absorb vibration generated from the engine.

In addition, according to the present invention, the spring of the torsion damper is disposed in the axial direction, which may maximally ensure the overall radial space of the power transmission apparatus.

In addition, according to the present invention, it is possible to minimize a degree to which dust produced from the torsion damper and contained in the working fluid is introduced into the transmission, thereby preventing a breakdown of the transmission caused by the introduction of dust.

BEST MODE

Hereinafter, exemplary embodiments of the present invention will be described in detail with reference to the accompanying drawings.

The present invention is not limited to the embodiments disclosed herein, but will be variously changed and implemented in various different forms. The embodiments are provided so that the present invention will be thorough and complete, and also to provide a more complete understanding of the scope of the present invention to those of ordinary skill in the art.

Therefore, it should be understood that the present invention is not limited to the embodiments disclosed below, but the configuration of any one embodiment and the configuration of another embodiment can be substituted or added, and the present invention includes all alterations, equivalents, and alternatives that are included in the technical spirit and scope of the present invention.

In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

A part irrelevant to the description will be omitted to clearly describe the present invention, and the same or similar constituent elements will be designated by the same reference numerals throughout the specification.

The size and thickness of each component illustrated in the drawings are arbitrarily shown for ease of description, but the present invention is not necessarily limited thereto. In order to clearly describe several portions and regions, thicknesses thereof are enlarged.

In the drawings, sizes or thicknesses of constituent elements may be exaggerated, increased, or decreased for convenience of understanding, but the protection scope of the present invention should not be restrictively construed.

The terms used in the present specification are used only for the purpose of describing particular examples or embodiments and are not intended to limit the present invention. Further, singular expressions include plural expressions unless clearly described as different meanings in the context.

In the present application, the terms "comprises," "comprising," "includes," "including," "containing," "has," "having", and other variations thereof are inclusive and therefore specify the presence of features, integers, steps, operations, elements, components, and/or combinations thereof disclosed in the specification. That is, in the present application, the terms "comprises," "comprising," "includes," "including," "containing," "has," "having", and other variations thereof need to be understood as not precluding the presence or addition of one or more other features, integers, steps, operations, elements, components, and/or combinations thereof.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

When one constituent element is described as being "disposed above" or "disposed below" another constituent element, it should be understood that one constituent element can be disposed directly on another constituent element, and an intervening constituent element can also be present between the constituent elements.

Unless otherwise defined, all terms used herein, including technical or scientific terms, have the same meaning as commonly understood by those skilled in the art to which the present invention pertains.

The terms such as those defined in a commonly used dictionary should be interpreted as having meanings consistent with meanings in the context of related technologies and should not be interpreted as ideal or excessively formal meanings unless explicitly defined in the present application.

For the convenience, the directions in the specification are defined as follows.

A forward/rearward direction or an axial direction is defined as a direction parallel to a rotation axis. A front (forward) means any one direction of a power source, e.g., a direction toward an engine. A rear (rearward) means the other direction, e.g., a direction toward a transmission. Therefore, a front surface means a surface facing forward, and a rear surface means a surface facing rearward.

A radial direction means a direction toward or away from a center of the rotation axis along a straight line passing through the center of the rotation axis on the plane perpendicular to the rotation axis. A direction radially away from the center is referred to as a centrifugal direction, and a direction toward the center is referred to as a centripetal direction.

A circumferential direction means a direction surrounding a circumference of the rotation axis. An outer periphery means an outer circumference, and an inner periphery means an inner circumference. Therefore, an outer peripheral surface is a surface facing away from the rotation axis, and an inner peripheral surface is a surface facing the rotation axis.

A circumferential surface means a surface, a normal line of which is directed in an approximately circumferential direction.

In addition, the term "unit", "means", "part", "member", or the like, which is described in the specification, means a unit of a comprehensive configuration that performs at least one function or operation.

Figure 1:
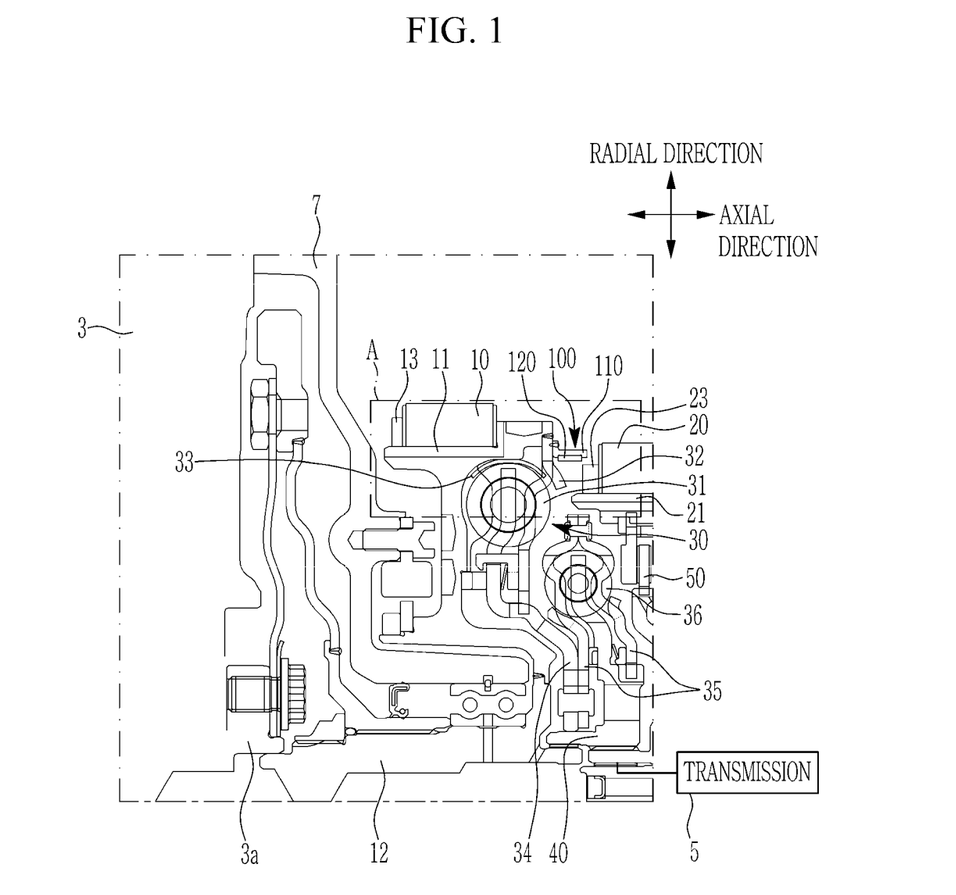
FIG. 1 is a cross-sectional view schematically illustrating a power transmission apparatus for a hybrid vehicle according to a first embodiment of the present invention.
Figure 2:
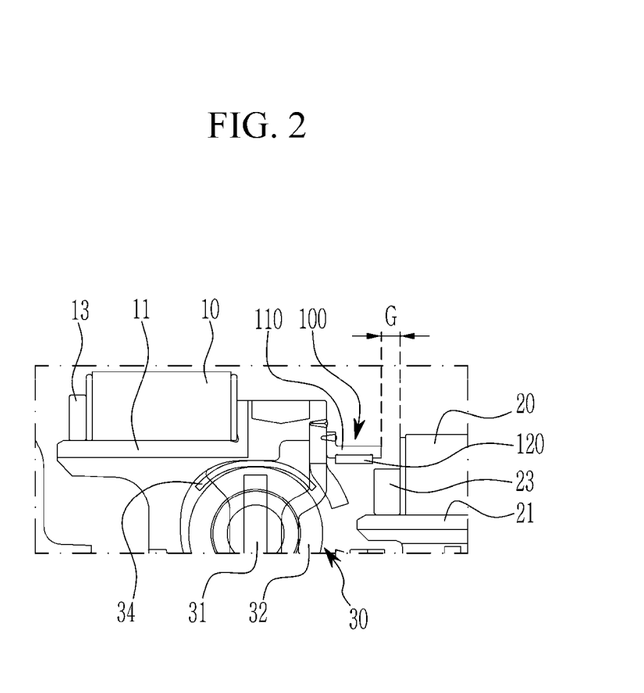
FIG. 2 is an enlarged view of part A in FIG. 1.
Figure 3:
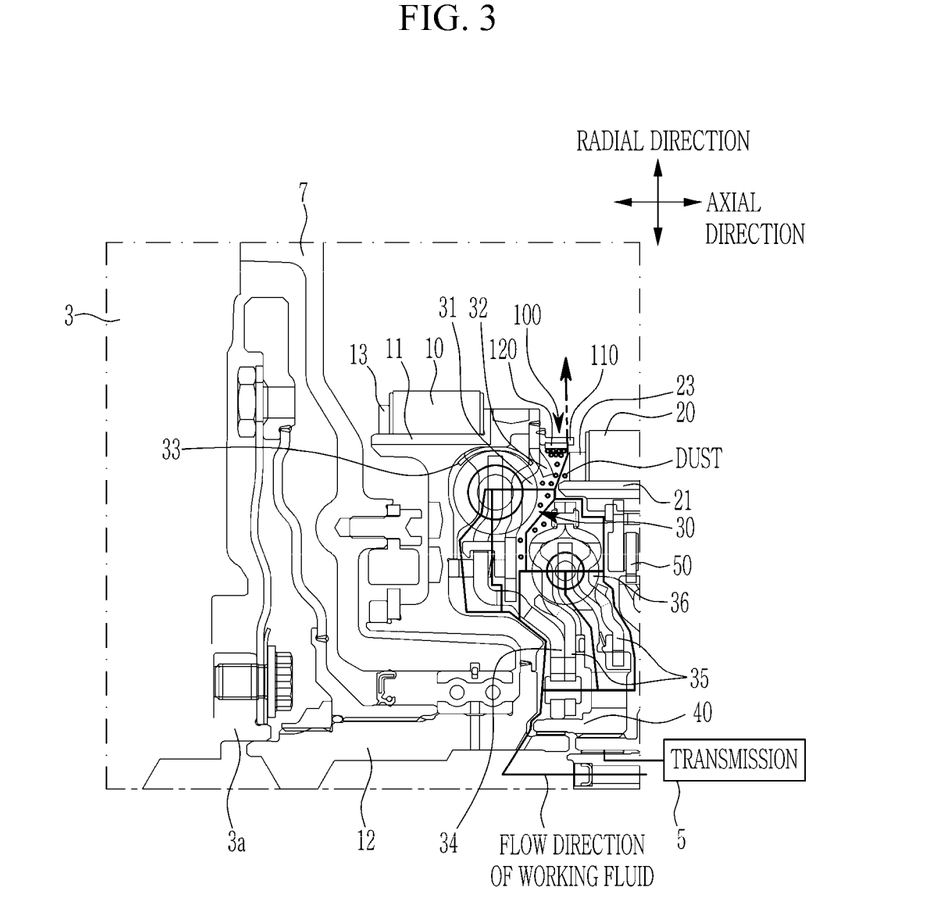
FIG. 3 is a view illustrating an operation of a dust collecting unit applied to the power transmission apparatus for a hybrid vehicle according to the first embodiment of the present invention.

FIG. 1 is a cross-sectional view schematically illustrating a power transmission apparatus for a hybrid vehicle according to a first embodiment of the present invention, FIG. 2 is an enlarged view of part A in FIG. 1, and FIG. 3 is a view illustrating an operation of a dust collecting unit applied to the power transmission apparatus for a hybrid vehicle according to the first embodiment of the present invention.

FIG. 1 is a half-cross-sectional view for explaining the first embodiment of the present invention and illustrates a part of the power transmission apparatus for a hybrid vehicle according to the first embodiment of the present invention.

With reference to FIG. 1, the power transmission apparatus for a hybrid vehicle according to the first embodiment of the present invention serves to selectively transmit rotational power, which is transmitted from an engine 3 and at least one motor, to a transmission 5 and is disposed between the engine 3 and the transmission 5.

In this case, the power transmission apparatus for a hybrid vehicle according to the first embodiment of the present invention includes a motor housing 7, at least one motor, a torsion damper 30, a spline hub 40, and a clutch 50.

Meanwhile, in the description of the power transmission apparatus for a hybrid vehicle according to the present invention, based on a rotation center axis illustrated in FIG. 1, a direction (leftward/rightward direction) parallel to the rotation center axis is defined as an axial direction, and a direction (upward/downward direction) orthogonal to the rotation center axis is defined as a radial direction.

In addition, in the case of the radial direction, a direction (downward direction) toward the rotation center axis is defined as a radially inward direction, and a direction (upward direction) away from the rotation center axis is defined as a radially outward direction.

First, the motor housing 7 is equipped with the at least one motor, the torsion damper 30, the spline hub 40, and the clutch 50 and coupled to a vehicle body (not illustrated).

The motor housing 7 may be disposed between the engine 3 and the transmission 5 and coupled to the engine 3 and a casing (not illustrated) of the transmission.

In the present embodiment, the at least one motor may include a first motor 10 and a second motor 20.

First, the first motor 10 is disposed in the motor housing 7 and connected to a crankshaft 3a of the engine 3.

In this case, the first motor 10 is disposed radially outside a first motor sleeve 11 fixed to a rotor shaft 12 configured to receive driving power from the engine 3 through the crankshaft 3a. The first motor 10 may be fixed to the first motor sleeve 11 by a first motor retainer 13.

Further, the second motor 20 is disposed in the motor housing 7, provided axially adjacent to the first motor 10, and connected to an input shaft (not illustrated) of a transmission 3.

In this case, the second motor 20 is disposed radially outside a second motor sleeve 21. The second motor 20 may be fixed to the second motor sleeve 23 by a second motor retainer 23.

The first motor 10 configured as described above may operate to start the engine 3, and the second motor 20 may operate to drive the vehicle.

In the present embodiment, the torsion damper 30 is disposed between the first motor 10 and the second motor 20. A radially outer side of the torsion damper 30 may be coupled to the first motor 10.

That is, one side of the torsion damper 30, which is positioned radially outward, may be coupled to the first motor sleeve 11.

Further, the spline hub 40 may be connected to the torsion damper 30 and transmit the driving power, which is transmitted to the torsion damper 30, to the transmission 5. The spline hub 40 may be axially coupled to the input shaft (not illustrated) of the transmission 5.

In this case, the torsion damper 30 may include a first spring 31, a first cover plate 32, a driven plate 33, a second cover plate 35, and a second spring 36.

First, the first spring 31 may be provided as at least one first spring 31, or the first spring 31 may be provided as a plurality of first springs 31 provided in a rotation direction of the torsion damper 30.

The first spring 31 may be elastically supported on a radial inner surface of the first motor sleeve 11 and absorb vibration and impact in the rotation direction.

One end of the cover plate 32, which is directed radially outward, is fixed to the first motor sleeve 11. The first cover plate 32 may be disposed to surround the first spring 31 and elastically support the first spring 31.

That is, at a position spaced apart radially outward from the first spring 31, the first cover plate 32 may be fixedly coupled to the first motor sleeve 11 by various coupling methods such as welding, bolting, or riveting, for example.

Therefore, the first cover plate 32 may rotate integrally with the first motor sleeve 11, and the driving power of the engine 3, which is transmitted through the first motor sleeve 11, may be transmitted directly to the first cover plate 32.

In this case, the first cover plates 32 may be disposed to face each other.

That is, the driving power of the engine 3, which is transmitted through the rotor shaft 12 and the first motor sleeve 11, may be transmitted to the first spring 31 through the first cover plate 32. In this process, the first spring 31 may absorb vibration and impact in the rotation direction.

The driven plate 33 may be elastically supported by the first spring 31, configured to receive the driving power, and connected to the spline hub 40.

Meanwhile, an outer peripheral surface of the first spring 31 may be elastically deformably supported by a spring guide 34 interposed between the radial inner surface of the first motor sleeve 11 and the first spring 31.

In the present embodiment, the second cover plate 35 is fixed to the driven plate 33.

The second spring 36 may be provided as at least one second spring 36, or the second spring 36 may be provided as a plurality of second springs 36 provided in the rotation direction of the torsion damper 30.

That is, the second spring 36 may be supported by the second cover plate 35, disposed in the rotation direction, and absorb vibration and impact in the rotation direction. In this case, the second spring 36 may be disposed at a position spaced apart radially inward from the first spring 31.

The second spring 36 may be connected to the spline hub 40. That is, the spline hub 40 is elastically supported by the second spring 36.

Therefore, the driving power, from which vibration and impact in the rotation direction are absorbed by the second spring 36, may be transmitted to the spline hub 40.

Meanwhile, the power transmission apparatus may use the first motor 10 as a mass body by assembling the torsion damper 30 to the first motor sleeve 11 that serves as a rotor at a side of the engine 3.

Therefore, the power transmission apparatus, together with the torsion damper 30, may efficiently absorb vibration generated from the engine 3.

Meanwhile, in the present embodiment, one embodiment is described in which the first and second springs 31 and 36 of the torsion damper 30 are disposed in series in the axial direction. However, the present invention is not limited thereto. A torsion damper in which a single spring is axially disposed in the rotation direction may be applied.

Further, the clutch 50 may be connected to the second motor sleeve 21 on which the second motor 20 is mounted. The clutch 50 may selectively connect the second motor 20 and the torsion damper 30.

In this case, the clutch 50 may be configured as a multi-plate clutch including a friction plate, a friction disc, a piston, and a hub that are not illustrated.

The power transmission apparatus configured as described above may further include a dust collecting unit 100.

As illustrated in FIGS. 1 and 2, the dust collecting unit 100 is installed in a working fluid flow path through which a working fluid introduced from the transmission 5 passes through the torsion damper 30 and flows between the first motor 10 and the second motor 20. The dust collecting unit 100 is installed at a position spaced apart radially outward from the torsion damper 30 based on the radial direction.

The dust collecting unit 100 collects dust that is produced from the first and second springs 31 and 36 of the torsion damper 30 and contained in the working fluid.

That is, the dust collecting unit 100 may be disposed between the first motor 10 and the second motor 20 and provided at a position spaced apart radially inward from the first motor 10.

Meanwhile, the dust may include iron powder or the like produced by friction between constituent elements and the first and second springs 31 and 36 that absorb vibration and impact in the rotation direction when the torsion damper 30 operates.

In the first embodiment of the present invention, the dust collecting unit 100 may include a mounting member 110 and a collection member 120.

First, the mounting member 110 is mounted on the first cover plate 32 so that the mounting member 110 partially protrudes toward the second motor 20 based on the axial direction.

In this case, the mounting member 110 may be fixedly coupled to the first cover plate 31 by various coupling methods such as welding, bolting, or riveting, for example.

In addition, the mounting member 110 may be bent in an "L" shape. A gap G may be formed between the mounting member 110 and the second motor 20 so that the working fluid flows between the mounting member 110 and the second motor 20.

The gap G may serve to allow the working fluid, which circulates in the motor housing 7, to pass through the torsion damper 30 from the transmission 4 and smoothly flow radially outward.

Further, the collection member 120 may be provided between the first motor 10 and the second motor 20 and mounted radially inside the mounting member 110.

In this case, the collection member 120 may be made of a material having a magnetic force so that dust produced from the first spring 31 or the second spring 36 is attached to the collection member 120.

An operation of the dust collecting unit 100 configured as described above will be described with reference to FIG. 3 attached hereto.

FIG. 3 is a view illustrating an operation of the dust collecting unit applied to the power transmission apparatus for a hybrid vehicle according to the first embodiment of the present invention.

With reference to FIG. 3, the working fluid introduced from the transmission 5 eliminates frictional heat generated from the torsion damper 30 while passing through the torsion damper 30 and then flows between the first and second motors 10 and 20.

In this case, the dust collecting unit 100 may collect iron-containing dust contained in the working fluid by means of the collection member 120 disposed in the flow path for the working fluid and provided radially outside the torsion damper 30.

That is, the dust contained in the working fluid is collected by being attached to the collection member 120 while passing through the collection member 120. Then, the amount of dust contained in the working fluid may be minimized.

Therefore, the dust collecting unit 100 may minimize a degree to which the dust is attached to the first and second motors 10 and 20, thereby improving the durability of the first and second motors 10 and 20, preventing the deterioration in performance of the first and second motors 10 and 20, and reducing an unnecessary loss of power.

Meanwhile, a power transmission apparatus for a hybrid vehicle according to a second embodiment of the present invention will be described with reference to FIGS. 4 and 5 attached hereto.

Figure 4:
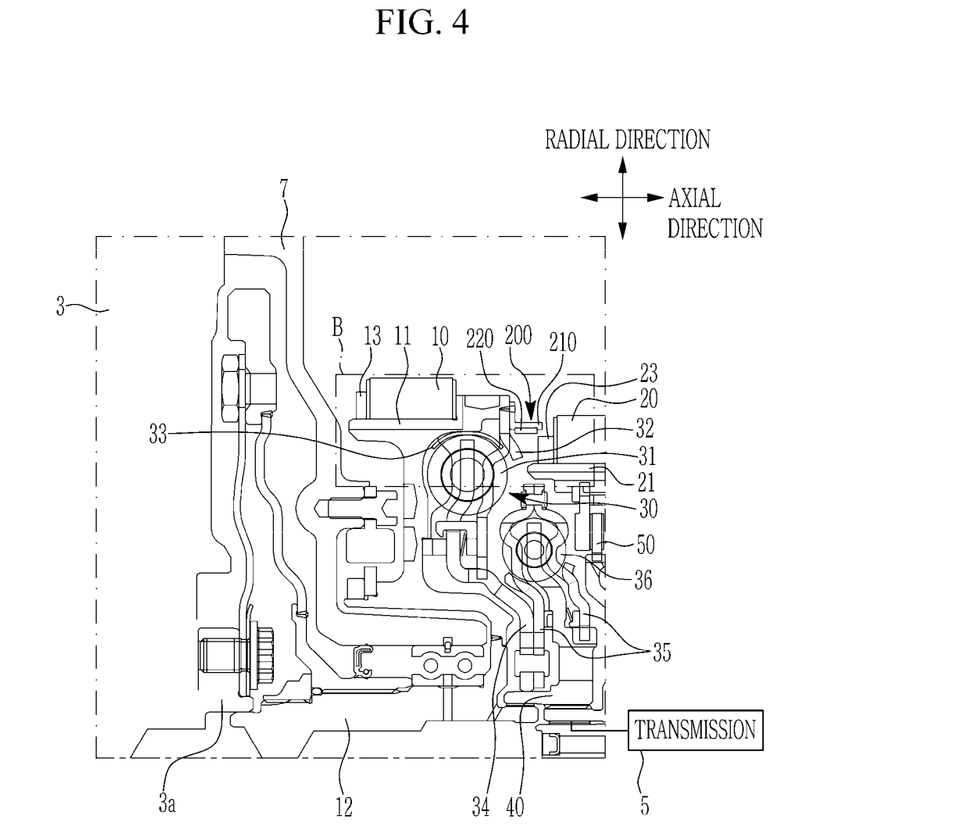
FIG. 4 is a cross-sectional view schematically illustrating a power transmission apparatus for a hybrid vehicle according to a second embodiment of the present invention.
Figure 5:
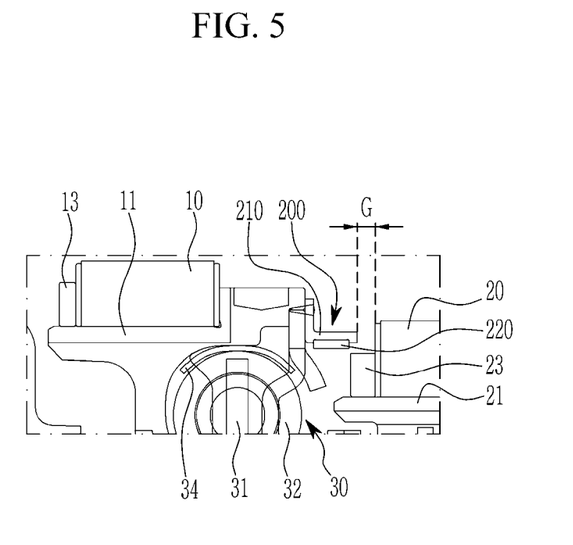
FIG. 5 is an enlarged view of part B in FIG. 4.

With reference to FIGS. 4 and 5, the power transmission apparatus for a hybrid vehicle according to the second embodiment of the present invention is identical in all configurations to that of the above-mentioned first embodiment, except for a dust collecting unit 200. Therefore, a detailed description of constituent elements identical to those of the above-mentioned first embodiment will be omitted.

As illustrated in FIGS. 4 and 5, the dust collecting unit 200 according to the second embodiment of the present invention is installed in a working fluid flow path through which a working fluid introduced from the transmission 5 passes through the torsion damper 30 and flows between the first motor 10 and the second motor 20. The dust collecting unit 200 is installed at a position spaced apart radially outward from the torsion damper 30 based on the radial direction.

The dust collecting unit 200 collects dust that is produced from the first and second springs 31 and 36 of the torsion damper 30 and contained in the working fluid.

That is, the dust collecting unit 200 may be disposed between the first motor 10 and the second motor 20 and provided at a position spaced apart radially inward from the first motor 10.

In the second embodiment of the present invention, the dust collecting unit 200 may include a mounting part 210 and a collection member 220.

First, the mounting part 210 is bent from the first cover plate 32 so that the mounting part 210 partially protrudes toward the second motor 20 based on the axial direction.

In this case, the mounting part 210 may be bent from the first cover plate 32 in a direction parallel to the axial direction. That is, the mounting part 210 is integrated with the first cover plate 32. A gap G may be formed between the mounting part 210 and the second motor 20 so that the working fluid flows between the mounting part 210 and the second motor 20.

The gap G may serve to allow the working fluid, which circulates in the motor housing 7, to pass through the torsion damper 30 from the transmission 4 and smoothly flow radially outward.

Further, the collection member 220 may be provided between the first motor 10 and the second motor 20 and mounted radially inside the mounting part 210.

In this case, the collection member 220 may be made of a material having a magnetic force so that dust produced from the first spring 31 or the second spring 36 is attached to the collection member 220.

Therefore, the working fluid introduced from the transmission 5 eliminates frictional heat generated from the torsion damper 30 while passing through the torsion damper 30 and then flows between the first and second motors 10 and 20.

In this case, the dust collecting unit 200 may collect iron-containing dust contained in the working fluid by means of the collection member 220 disposed in the flow path for the working fluid and provided radially outside the torsion damper 30.

That is, the dust contained in the working fluid is collected by being attached to the collection member 220 while passing through the collection member 220. Then, the amount of dust contained in the working fluid may be minimized.

Therefore, the dust collecting unit 200 according to the second embodiment of the present invention may minimize a degree to which the dust is attached to the first and second motors 10 and 20, thereby improving the durability of the first and second motors 10 and 20, preventing the deterioration in performance of the first and second motors 10 and 20, and reducing an unnecessary loss of power.

Meanwhile, a power transmission apparatus for a hybrid vehicle according to a third embodiment of the present invention will be described with reference to FIGS. 6 and 7 attached hereto.

Figure 6:
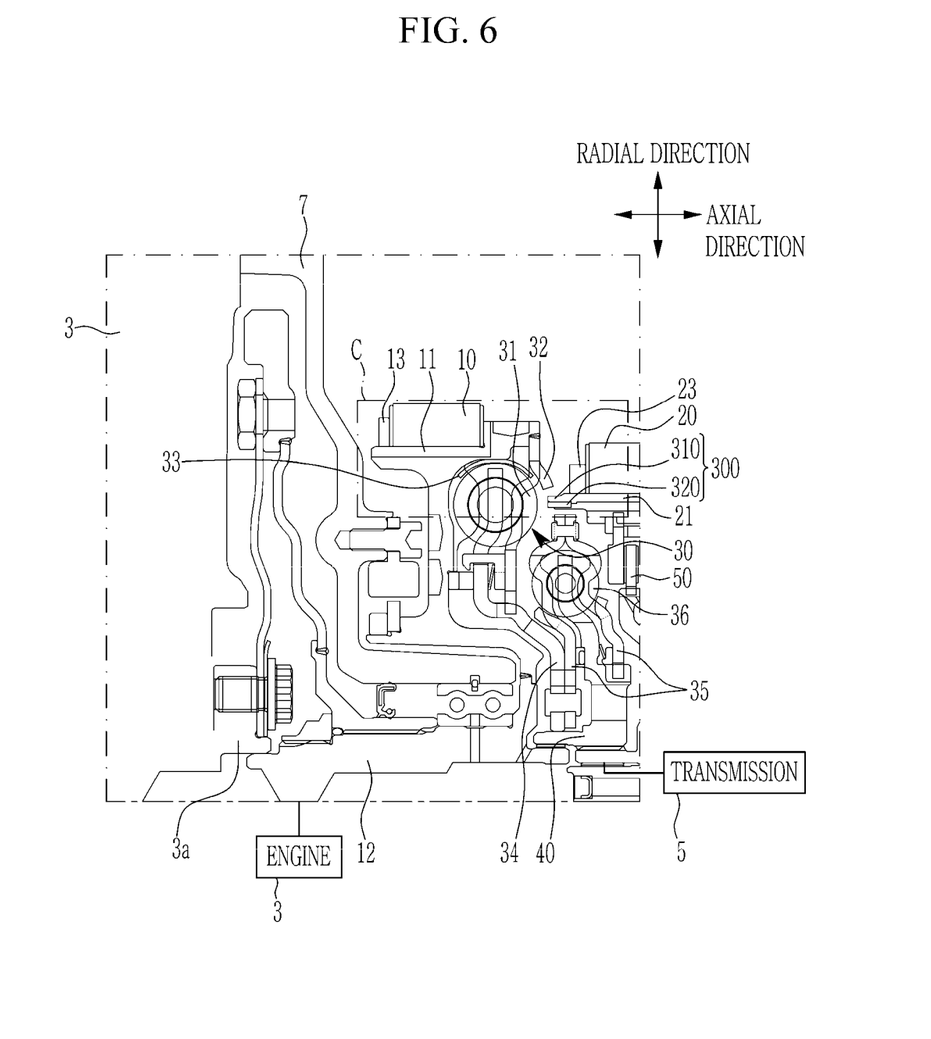
FIG. 6 is a cross-sectional view schematically illustrating a power transmission apparatus for a hybrid vehicle according to a third embodiment of the present invention.
Figure 7:
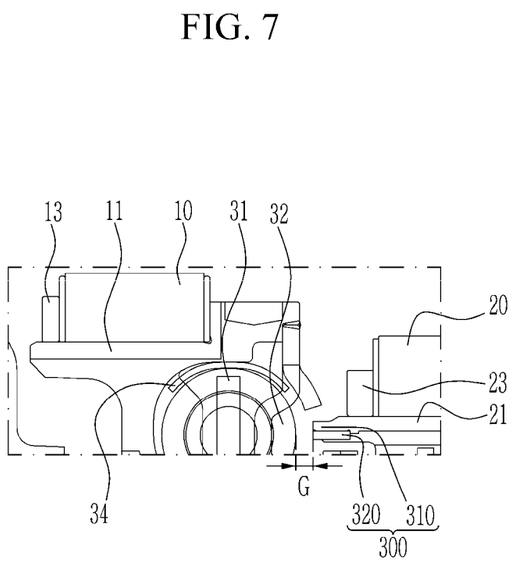
FIG. 7 is an enlarged view of part C in FIG. 6.

With reference to FIGS. 6 and 7, the power transmission apparatus for a hybrid vehicle according to the third embodiment of the present invention is identical in all configurations to that of the above-mentioned first embodiment, except for a dust collecting unit 300. Therefore, a detailed description of constituent elements identical to those of the above-mentioned first embodiment will be omitted.

As illustrated in FIGS. 6 and 7, the dust collecting unit 300 according to the third embodiment of the present invention is installed in a working fluid flow path through which a working fluid introduced from the transmission 5 passes through the torsion damper 30 and flows between the first motor 10 and the second motor 20. The dust collecting unit 300 is installed at a position spaced apart radially outward from the torsion damper 30 based on the radial direction.

The dust collecting unit 300 collects dust that is produced from the first and second springs 31 and 36 of the torsion damper 30 and contained in the working fluid.

That is, the dust collecting unit 300 according to the third embodiment of the present invention may be disposed between the first motor 10 and the second motor 20 and provided at a position spaced apart radially inward from the first motor 10.

In this case, the dust collecting unit 300 may include a mounting part 310 and a collection member 320.

First, the mounting part 310 integrally protrudes from the second motor sleeve 21 toward the first motor 10 based on the axial direction.

In this case, the mounting part 310 may protrude from the second motor sleeve 21 in a direction parallel to the axial direction. That is, the mounting part 310 is integrated with the second motor sleeve 21. A gap G may be formed between the mounting part 310 and the torsion damper 30 so that the working fluid flows between the mounting part 310 and the torsion damper 30.

The gap G may serve to allow the working fluid, which circulates in the motor housing 7, to pass through the torsion damper 30 from the transmission 4 and smoothly flow radially outward.

Further, the collection member 320 may be provided between the first motor 10 and the second motor 20 and mounted radially inside the mounting part 310.

In this case, the collection member 320 may be made of a material having a magnetic force so that dust produced from the first spring 31 or the second spring 36 is attached to the collection member 320.

Therefore, the working fluid introduced from the transmission 5 eliminates frictional heat generated from the torsion damper 30 while passing through the torsion damper 30 and then flows between the first and second motors 10 and 20.

In this case, the dust collecting unit 300 may collect iron-containing dust contained in the working fluid by means of the collection member 320 disposed in the flow path for the working fluid and provided radially outside the torsion damper 30.

That is, the dust contained in the working fluid is collected by being attached to the collection member 320 while passing through the collection member 320. Then, the amount of dust contained in the working fluid may be minimized.

Therefore, the dust collecting unit 300 according to the third embodiment of the present invention may minimize a degree to which the dust is attached to the first and second motors 10 and 20, thereby improving the durability of the first and second motors 10 and 20, preventing the deterioration in performance of the first and second motors 10 and 20, and reducing an unnecessary loss of power.

Further, a power transmission apparatus for a hybrid vehicle according to a fourth embodiment of the present invention will be described with reference to FIGS. 8 and 9 attached hereto.

Figure 8:
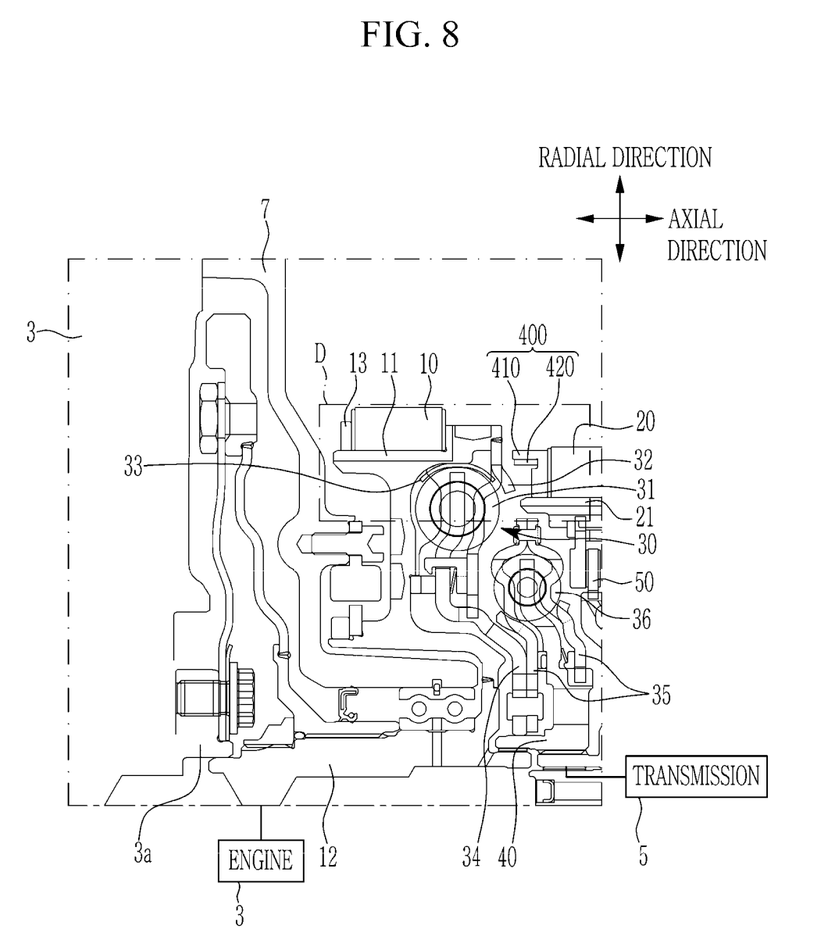
FIG. 8 is a cross-sectional view schematically illustrating a power transmission apparatus for a hybrid vehicle according to a fourth embodiment of the present invention.
Figure 9:
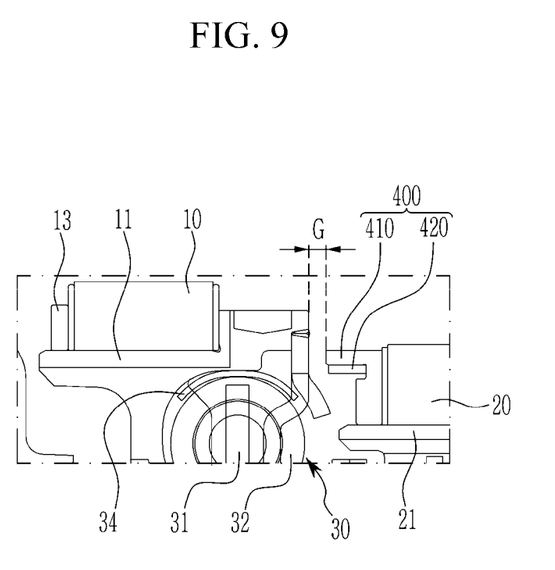
FIG. 9 is an enlarged view of part D in FIG. 8.

With reference to FIGS. 8 and 9, the power transmission apparatus for a hybrid vehicle according to the fourth embodiment of the present invention is identical in all configurations to that of the above-mentioned first embodiment, except for a dust collecting unit 400. Therefore, a detailed description of constituent elements identical to those of the above-mentioned first embodiment will be omitted.

As illustrated in FIGS. 8 and 9, the dust collecting unit 400 according to the fourth embodiment of the present invention is installed in a working fluid flow path through which a working fluid introduced from the transmission 5 passes through the torsion damper 30 and flows between the first motor 10 and the second motor 20. The dust collecting unit 400 is installed at a position spaced apart radially outward from the torsion damper 30 based on the radial direction.

The dust collecting unit 400 collects dust that is produced from the first and second springs 31 and 36 of the torsion damper 30 and contained in the working fluid.

That is, the dust collecting unit 400 according to the fourth embodiment of the present invention may be disposed between the first motor 10 and the second motor 20 and provided at a position spaced apart radially inward from the first motor 10.

In this case, the dust collecting unit 400 may include a mounting part 410 and a collection member 420.

First, the mounting part 410 integrally protrudes from the second motor retainer 23 toward the first motor 10 based on the axial direction.

In this case, the mounting part 410 may protrude in a direction parallel to the axial direction from a position adjacent radially outward to the second motor retainer 23. That is, the mounting part 410 is integrated with the second motor retainer 23. A gap G may be formed between the mounting part 410 and the torsion damper 30 so that the working fluid flows between the mounting part 410 and the torsion damper 30.

The gap G may serve to allow the working fluid, which circulates in the motor housing 7, to pass through the torsion damper 30 from the transmission 4 and smoothly flow radially outward.

Further, the collection member 420 may be provided between the first motor 10 and the second motor 20 and mounted radially inside the mounting part 410.

In this case, the collection member 420 may be made of a material having a magnetic force so that dust produced from the first spring 31 or the second spring 36 is attached to the collection member 420.

Therefore, the working fluid introduced from the transmission 5 eliminates frictional heat generated from the torsion damper 30 while passing through the torsion damper 30 and then flows between the first and second motors 10 and 20.

In this case, the dust collecting unit 400 may collect iron-containing dust contained in the working fluid by means of the collection member 420 disposed in the flow path for the working fluid and provided radially outside the torsion damper 30.

That is, the dust contained in the working fluid is collected by being attached to the collection member 420 while passing through the collection member 420. Then, the amount of dust contained in the working fluid may be minimized.

Therefore, the dust collecting unit 400 according to the fourth embodiment of the present invention may minimize a degree to which the dust is attached to the first and second motors 10 and 20, thereby improving the durability of the first and second motors 10 and 20, preventing the deterioration in performance of the first and second motors 10 and 20, and reducing an unnecessary loss of power.

Therefore, according to the power transmission apparatus for a hybrid vehicle according to the first to fourth embodiments of the present invention configured as described above, in the hybrid vehicle equipped with the first and second motors 10 and 20 and the torsion damper 30, the dust collecting unit 100, 200, 300, or 400 minimizes a degree to which dust produced by the torsion damper 30 is dispersed in the state of being contained in the working fluid and introduced into the first and second motors 10 and 20 and the transmission. Therefore, it is possible to prevent the deterioration in performance of the motor and the fuel economy.

In addition, according to the present invention, it is possible to prevent the deterioration in fuel economy by preventing the deterioration in performance of the first and second motors 10 and 20, thereby reducing an unnecessary loss of power and meeting the requirements related to environmental issues and fuel economy.

In addition, according to the present invention, the first motor 10 is used as a mass body by assembling the torsion damper 30 to the first motor sleeve 11 that serves as a rotor at the side of the engine 3. Therefore, the power transmission apparatus, together with the torsion damper 30, may efficiently absorb vibration generated from the engine 3.

In addition, according to the present invention, at least one of the first and second springs 32 and 36 of the torsion damper 30 is disposed in the axial direction, which may maximally ensure the overall radial space of the power transmission apparatus.

In addition, according to the present invention, it is possible to minimize a degree to which dust produced from the torsion damper 30 and contained in the working fluid is introduced into the transmission 5, thereby preventing a breakdown of the transmission 5 caused by the introduction of dust.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

Further, even though the operational effects of the configurations of the present invention have not been explicitly disclosed and described in the description of the embodiment of the present invention, the effects, which can be expected by the corresponding configurations, should, of course, be acceptable.

The invention claimed is:

1. A power transmission apparatus for a hybrid vehicle, the power transmission apparatus comprising:
   a motor housing disposed between an engine and a transmission;
   at least one motor disposed in the motor housing and connected to a crankshaft of the engine or the transmission;
   a torsion damper provided in the motor housing, disposed between the engine and the transmission, and having a radially outer side coupled to the at least one motor;
   a spline hub connected to the torsion damper and configured to transmit driving power, which is transmitted to the torsion damper, to the transmission; and
   a dust collector disposed in a working fluid flow path through which a working fluid introduced from the transmission passes through the torsion damper and flows toward the at least one motor, installed at a position spaced apart radially outward from the torsion damper, and configured to collect dust produced from the torsion damper and contained in the working fluid,
   wherein the at least one motor comprises:
   a first motor disposed in the motor housing and connected to the crankshaft of the engine; and
   a second motor disposed adjacent to the first motor in an axial direction and connected to the transmission.

2. The power transmission apparatus of claim 1, wherein the dust collector is disposed between the first motor and the second motor and provided at a position spaced apart radially inward from the first motor.

3. The power transmission apparatus of claim 1, wherein the first motor is disposed radially outside a first motor sleeve fixed to a rotor shaft configured to receive driving power from the engine through the crankshaft, and the first motor is fixed to the first motor sleeve by a first motor retainer.

4. The power transmission apparatus of claim 3, wherein the torsion damper comprises:
   at least one first spring elastically supported by the first motor sleeve and configured to absorb vibration and impact in a rotation direction;
   a first cover plate fixed to the first motor sleeve and configured to support the first spring;

a driven plate elastically supported by the at least one first spring, configured to receive driving power, and connected to the spline hub;
a second cover plate fixed to the driven plate; and
at least one second spring supported by the second cover plate, disposed in the rotation direction, and configured to absorb vibration and impact in the rotation direction.

5. The power transmission apparatus of claim 4, wherein the torsion damper is disposed between the first motor and the second motor, and the first cover plate is coupled to the first motor sleeve and provided at a position spaced apart radially outward from the first spring.

6. The power transmission apparatus of claim 4, wherein an outer peripheral surface of the at least one first spring is elastically deformably supported by a spring guide interposed between the at least one first spring and a radial inner surface of the first motor sleeve.

7. The power transmission apparatus of claim 4, wherein the at least one second spring is connected to the spline hub.

8. The power transmission apparatus of claim 4, wherein the dust collector comprises:
a mounting member mounted on the first cover plate so that the mounting member partially protrudes toward the second motor based on the axial direction; and
a collection member disposed between the first motor and the second motor and mounted radially inside the mounting member.

9. The power transmission apparatus of claim 8, wherein the mounting member is bent in an "L" shape, and a gap is formed between the mounting member and the second motor so that the working fluid flows between the mounting member and the second motor.

10. The power transmission apparatus of claim 8, wherein the collection member is made of a material having a magnetic force so that dust produced from the at least one first spring or the at least one second spring is attached to the collection member.

11. The power transmission apparatus of claim 8, wherein the mounting member is fixedly coupled to the first cover plate.

12. The power transmission apparatus of claim 4, wherein the dust collector comprises:
a mounting part bent from the first cover plate so that the mounting part partially protrudes toward the second motor based on the axial direction; and
a collection member disposed between the first motor and the second motor and mounted radially inside the mounting part.

13. The power transmission apparatus of claim 12, wherein the mounting part is bent in a direction parallel to the axial direction, and a gap is formed between the mounting part and the second motor so that the working fluid flows between the mounting part and the second motor.

14. The power transmission apparatus of claim 12, wherein the collection member is made of a material having a magnetic force so that dust produced from the at least one first spring or the at least one second spring is attached to the collection member.

15. The power transmission apparatus of claim 1, wherein the second motor is disposed radially outside a second motor sleeve and fixed to the second motor sleeve by a second motor retainer.

16. The power transmission apparatus of claim 15, wherein the dust collector comprises:

a mounting part integrally protruding from the second motor sleeve toward the first motor based on the axial direction; and
a collection member mounted radially inside the mounting part.

17. The power transmission apparatus of claim 16, wherein the mounting part protrudes in a direction parallel to the axial direction, and a gap is formed between the mounting part and the torsion damper so that the working fluid flows between the mounting part and the torsion damper.

18. The power transmission apparatus of claim 16, wherein the collection member is made of a material having a magnetic force so that dust produced from the at least one first spring or the at least one second spring is attached to the collection member.

19. The power transmission apparatus of claim 15, wherein the dust collector comprises:
a mounting part integrally protruding from the second motor retainer toward the first motor based on the axial direction; and
a collection member mounted radially inside the mounting part.

20. The power transmission apparatus of claim 19, wherein the mounting part protrudes in a direction parallel to the axial direction, and a gap is formed between the mounting part and the torsion damper so that the working fluid flows between the mounting part and the torsion damper.

21. The power transmission apparatus of claim 19, wherein the collection member is made of a material having a magnetic force so that dust produced from the at least one first spring or the at least one second spring is attached to the collection member.

22. The power transmission apparatus of claim 1, further comprising:
a clutch installed on the second motor and configured to selectively connect the second motor and the torsion damper.

23. A power transmission apparatus for a hybrid vehicle, the power transmission apparatus comprising:
a motor housing disposed between an engine and a transmission;
at least one motor disposed in the motor housing and connected to a crankshaft of the engine or the transmission;
a torsion damper provided in the motor housing, disposed between the engine and the transmission, and having a radially outer side coupled to the at least one motor;
a working fluid flow path through which a working fluid introduced from the transmission passes through the torsion damper and flows toward the at least one motor;
a spline hub connected to the torsion damper and configured to transmit driving power, which is transmitted to the torsion damper, to the transmission; and
a dust collector disposed in the working fluid flow path, installed at a position spaced apart radially outward from the torsion damper, and configured to collect dust produced from the torsion damper and contained in the working fluid,
wherein the dust collector is located laterally, in an axial direction of the power transmission apparatus, relative to a location in the working fluid flow path where portions of the power transmission apparatus provide a gap for the working fluid flow path.

* * * * *